United States Patent
Baize et al.

(10) Patent No.: US 7,930,727 B1
(45) Date of Patent: Apr. 19, 2011

(54) SYSTEM AND METHOD FOR MEASURING AND ENFORCING SECURITY POLICY COMPLIANCE FOR SOFTWARE DURING THE DEVELOPMENT PROCESS OF THE SOFTWARE

(75) Inventors: Eric Baize, Sudbury, MA (US); Jamie Albertson, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 1187 days.

(21) Appl. No.: 11/393,396

(22) Filed: Mar. 30, 2006

(51) Int. Cl.
*G06F 17/00* (2006.01)
*H04L 29/06* (2006.01)

(52) U.S. Cl. .................................... 726/1; 726/6

(58) Field of Classification Search .................... 726/1, 6
See application file for complete search history.

(56) References Cited

U.S. PATENT DOCUMENTS

| | | | | |
|---|---|---|---|---|
| 6,405,364 B1 * | 6/2002 | Bowman-Amuah | ........... | 717/101 |
| 6,901,346 B2 * | 5/2005 | Tracy et al. | ................... | 702/181 |
| 7,039,898 B2 * | 5/2006 | Shah | .......................... | 717/107 |
| 7,152,221 B2 * | 12/2006 | Andrew et al. | ............... | 717/102 |
| 7,246,370 B2 * | 7/2007 | Valente et al. | .................... | 726/1 |
| 7,290,275 B2 * | 10/2007 | Baudoin et al. | ................... | 726/1 |
| 7,340,469 B1 * | 3/2008 | Alghathbar et al. | .................. | 1/1 |
| 7,559,080 B2 * | 7/2009 | Bhargavan et al. | ............... | 726/1 |
| 7,653,893 B2 * | 1/2010 | Neumann et al. | ............. | 717/101 |
| 7,823,206 B2 * | 10/2010 | Sugimoto | ........................ | 726/25 |
| 7,832,007 B2 * | 11/2010 | Anderson et al. | ............... | 726/22 |
| 7,865,388 B2 * | 1/2011 | Brumbaugh et al. | ............. | 705/9 |
| 7,877,780 B2 * | 1/2011 | Kolawa et al. | .................... | 726/1 |
| 2002/0069035 A1 * | 6/2002 | Tracy et al. | .................... | 702/181 |
| 2003/0050718 A1 * | 3/2003 | Tracy et al. | ..................... | 700/91 |
| 2003/0084324 A1 * | 5/2003 | Koved et al. | .................. | 713/200 |
| 2003/0200464 A1 * | 10/2003 | Kidron | ......................... | 713/201 |
| 2003/0233585 A1 * | 12/2003 | Quick et al. | .................. | 713/202 |
| 2004/0025016 A1 * | 2/2004 | Focke et al. | .................... | 713/164 |
| 2004/0111641 A1 * | 6/2004 | Oshima et al. | ................ | 713/201 |
| 2004/0193907 A1 * | 9/2004 | Patanella | ...................... | 713/200 |
| 2004/0225480 A1 * | 11/2004 | Dunham | .......................... | 703/1 |
| 2005/0086197 A1 * | 4/2005 | Boubez et al. | .................... | 707/1 |
| 2005/0091219 A1 * | 4/2005 | Karachale et al. | .............. | 707/10 |
| 2005/0132324 A1 * | 6/2005 | Guyette | ........................ | 717/101 |
| 2005/0177812 A1 * | 8/2005 | Andrew et al. | ............... | 717/100 |
| 2005/0203771 A1 * | 9/2005 | Achan | ............................... | 705/2 |
| 2006/0174222 A1 * | 8/2006 | Thonse et al. | ................. | 717/106 |
| 2006/0200803 A1 * | 9/2006 | Neumann et al. | ............. | 717/120 |
| 2006/0225124 A1 * | 10/2006 | Kolawa et al. | .................... | 726/1 |
| 2007/0168913 A1 * | 7/2007 | Sarukkai et al. | ............. | 717/101 |

\* cited by examiner

*Primary Examiner* — David Garcia Cervetti

(74) *Attorney, Agent, or Firm* — Krishnendu Gupta; Joseph D'Angelo

(57) ABSTRACT

A method, computer program product, and apparatus for managing compliance to security policy by measuring it and enforcing security policy compliance based on the measurement for software under development.

7 Claims, 6 Drawing Sheets

SYSTEM AND METHOD FOR MEASURING AND ENFORCING SECURITY POLICY COMPLIANCE FOR SOFTWARE DURING THE DEVELOPMENT PROCESS OF THE SOFTWARE

RELATED APPLICATION

This U.S. Patent application is related to an application with Ser. No. 11/393,231 entitled "Architecture for Measuring and Enforcing Security Policy Compliance for Software during the Development Process of the Software" being filed on even date, Mar. 30, 2006, to inventor Baize et al. and assigned to EMC Corporation of Hopkinton, the same assignee as this application.

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to security for computer software, and more specifically, for managing compliance to security policy by measuring and enforcing compliance for such software during the development of the software

BACKGROUND OF THE INVENTION

As is known in the art, computer systems generally include a platform generally comprised of a certain hardware base, including a central processing unit and computer memory, an operating system, and application or utility software that runs on top of the operating system. Data storage systems typically include some elements of a computer system and data storage devices installed in an array fashion. Such data storage systems are useful if accessible by users and applications using other computer systems, but typically some software may be accessible to some users and not others depending on what level of software has been installed on their computer and/or the data storage system.

Security is a very important aspect of software and data storage in general. Raised security expectations among customers who buy and use computer software can be attributed to the necessity to comply with a multitude of regulations and the need to protect them against vulnerability exploitation. As examples of these new expectations, the following practices and behaviors are now common. Customers are conducting vulnerability assessments against the products they purchase and deploy. Compliance officers now mandate specific security functions in products deployed within the corporation. IT security teams are now tasked with routinely running security scanning tools on networked devices. The timeline for patching vulnerabilities in products is now a matter of days or weeks, not months.

Security flaws in computer software are often to blame for at least some of the vulnerabilities presented by such software. Such flaws include design flaws, development process flaws, and incomplete security testing. Design flaws are either the lack of critical security functions, or a poor implementation of a security feature. Typical examples are sending clear text password over IP networks or the use of weak cryptographic algorithms. Software development flaws are mistakes that occur during development that can result in security incidents. Well-known examples of software development flaws are the use of $3^{rd}$ party products with publicly available exposures and remedies or buffer overflows which are created by a lack of character string length control. Testing flaws refer to security vulnerabilities that persist because the security vulnerabilities are not discovered, or if discovered not fixed prior to general acceptance. It would be advancement in the computer arts for there to be a tool that closely binds these areas with a methodology to measure and lessen security vulnerabilities of computer software. It would also be advancement if such a tool were easy to use, efficient, and at least in part computer-executed.

SUMMARY OF THE INVENTION

To overcome the problems and provide the advantages that have been described above, the present invention in one embodiment is a method for managing compliance to security policy for software being developed. The method includes the steps of setting a security policy that software being developed is required to comply with, measuring compliance to the security policy by the software being developed, creating a scorecard of the measured compliance and using the scorecard to enforce the security policy by ensuring that the software being developed meets a predetermined level of compliance as measured by the scorecard.

In another embodiment a computer program product is provided for managing compliance to security policy for software being developed wherein the security policy is set, wherein the software is required to comply with the security policy. The computer computer-readable medium encoded with program logic for allowing the following computer-executable steps to occur: measuring compliance to the security policy by the software being developed; creating a scorecard of the measured compliance; and using the scorecard created to enforce the security policy by ensuring that the software being developed meet a predetermined level of compliance as measured by the scorecard.

In another embodiment an apparatus is provided for managing compliance to security policy for software being developed wherein the security policy is set and the software is required to comply with the security policy. The apparatus includes logic comprising means for measuring compliance to the security policy by the software being developed. It also includes means for creating a scorecard of measured compliance by the means for measuring compliance, and means for using a scorecard created by the means for creating a scorecard to enforce the security policy by ensuring that the software being developed meets a predetermined level of compliance as measured by the scorecard.

BRIEF DESCRIPTION OF THE DRAWINGS

The above and further advantages of the present invention may be better understood by referring to the following description taken into conjunction with the accompanying drawings in which.

DETAILED DESCRIPTION OF THE PREFERRED EMBODIMENT

The methods and apparatus of the present invention are intended for use in development of software for computer systems including networked host computers and/or data storage systems, such as the CLARiiON Disk Array system or EMC's Symmetrix Data Storage System, each being available from EMC Corporation of Hopkinton, Mass.

Overview

The invention includes embodiments that provide a methodology for providing computer software that has been managed and measured during the development process so that security vulnerabilities are lessened over the prior art. Moreover, security policy is enforced using measurement data gained during the development process. An objective of decreasing the prior art state of security vulnerabilities is addressed with a process for lessening security flaws in the areas of design and development. Testing focusing on improving security is also included with a tool that includes computer-executed steps.

Overall, computer-executed steps related to the management, measurement, and enforcement help to automate at least part of the process and improve its repeatability by eliminating at least some manual steps and objectifying criteria used to evaluate security.

Embodiment Shown in Environment in which the Invention is Useful

Figure 1:
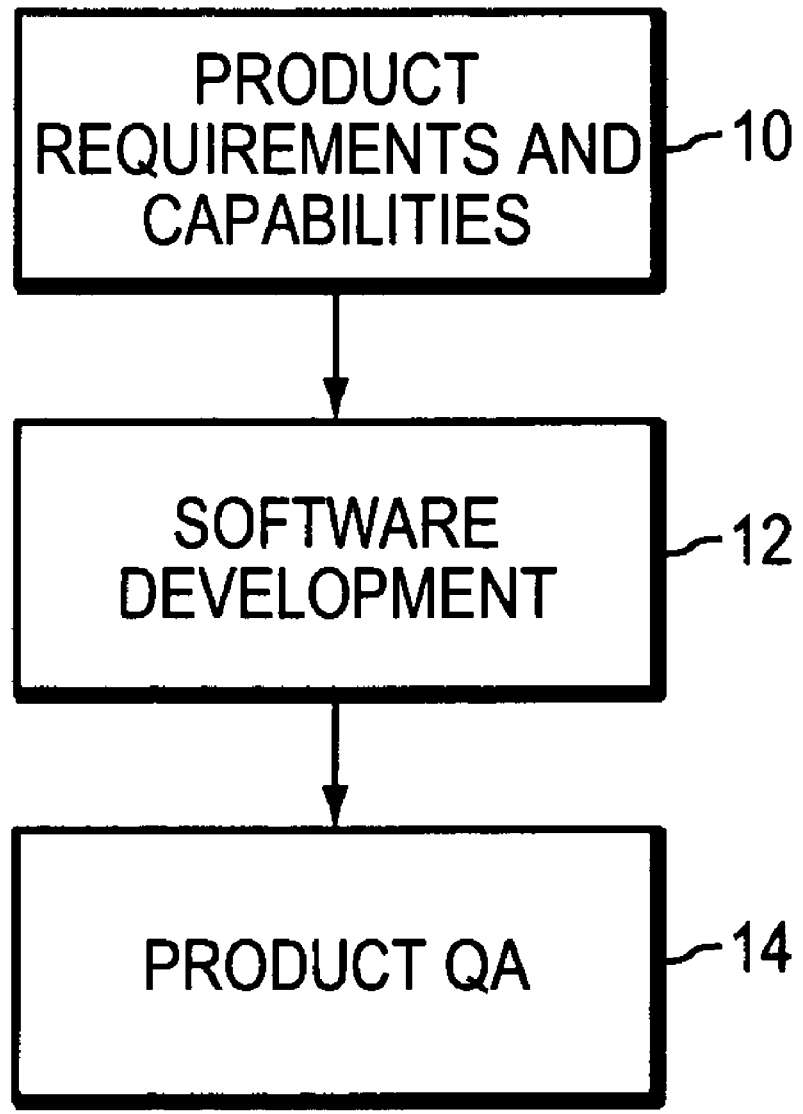
FIG. 1 is a diagram of an overview of software development, which is prior art and which is a field of endeavor in which the present invention is useful.

FIG. 1 shows an art overview of software development that does not explicitly address enforcing security policy. Generally such development includes the steps of defining and assessing Products Requirements and Capabilities 10, Software Development of the Software Product 12, and Quality Assurance (QA) 14 of the product. This is a broad overview, but the inventors have critically recognized a need to include enforcing security guidelines or policy as part of the development process and such steps are described below. Moreover the inventors have recognized that it is advantageous to include such development processes in an automated and efficient manner for the sake of economics and ensuring repeatability. Further the inventors have recognized that security requirements should best be identified and agreed upon prior to development of software because it is less expensive and more effective to do so, and the use of the embodiments described herein greatly improve the capability to do this.

Figure 2:
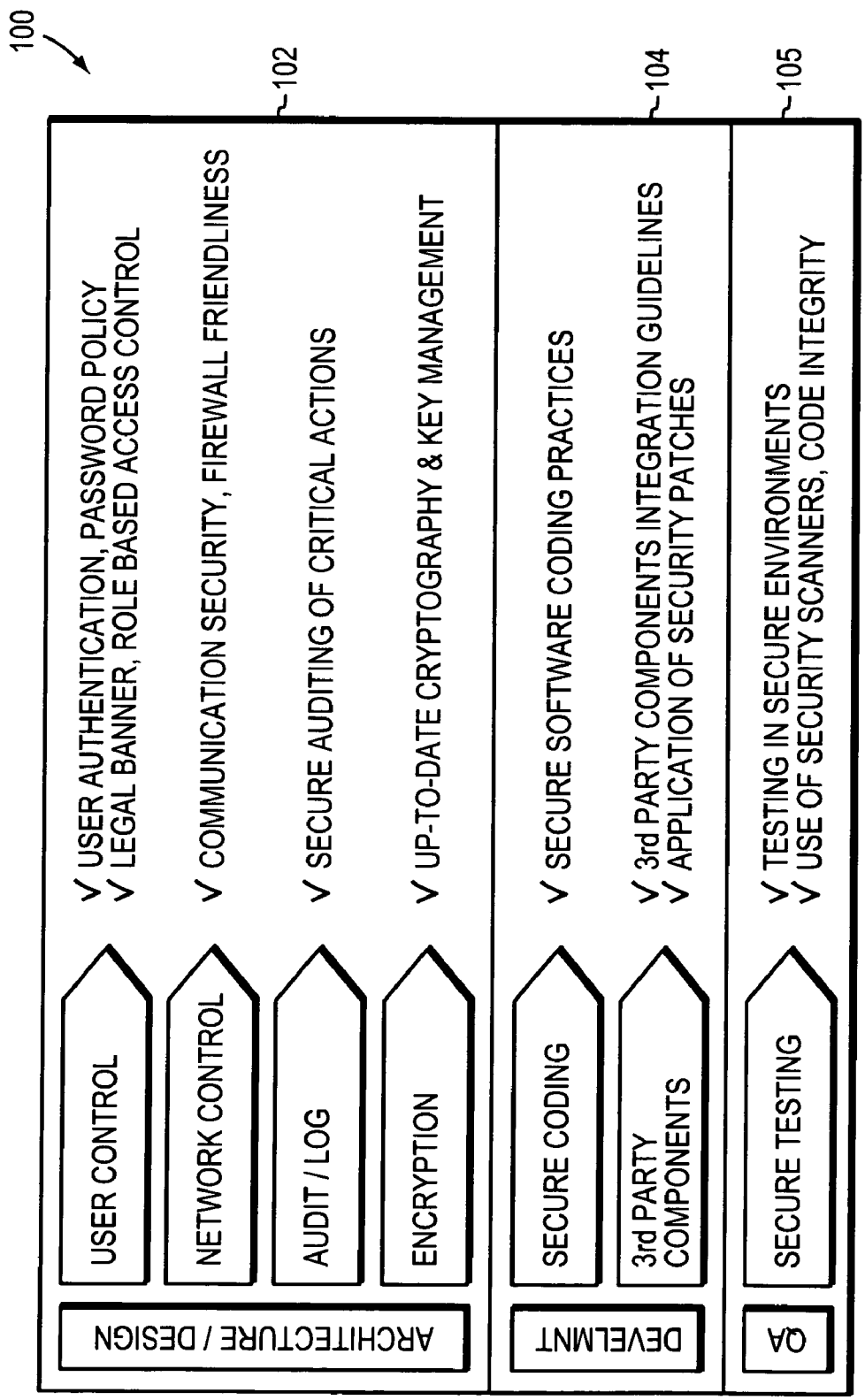
FIG. 2 is a schematic diagram of a data structure including architectural, design and testing requirements for managing, measuring, and enforcing security policy in a software development environment.

FIG. 2 shows a schematic diagram of a data structure 100 including architectural, design and testing criteria for managing security policy by measuring it and using the measured security policy in a software development environment to enforce such security policy. It is from such requirements that methodology described in relation to FIG. 5 draws key facets. Architecture and design features are shown in block 102. These features include User Control for user authentication, password policy legal banner, role based access control; Network Control for communication security, firewall friendliness; Audit/Log for secure auditing of critical actions; and Encryption for up-to-date cryptography & key management.

Still referring to FIG. 2, Software Development criteria useful with processes for implementing such architectural features are shown in block 104. In Block 102 aspects of Software Development are improved in conjunction with the features of block 104, and as explained for implementation with the methodology discussed below with reference to FIG. 5. These aspects include Secure Coding including secure software coding practices, and handling 3rd Party Components including integration guidelines and application of security patches. QA aspects in block 105 include requirements for Secure Testing in secure environments and including the use of security scanners and such tools for ensuring code integrity.

More detail about these aspects and considerations are now given. With regard to User Control, a fundamental aspect is to protect computer system resources from unauthorized access. The inventors have critically recognized that password policy that includes management of password and log-on procedures and requirements should be enforced and architecture and methodology described herein enables such. Policy enforced by the tool embodiments of the invention, allow for central management of end-user access, authentication for users, and unique identifiers for each user so that the activities of a single user can be traced.

Password policy includes requiring allowing end-users to select and change their own passwords, confirming such changes to reduce error, and quality control of passwords to require strong passwords. An example of strong passwords include a minimum password length, such as eight characters, inclusion of special non-alphabetic or non-numeric characters, disallowance of consecutive identical characters, and limited duration of password validity. Further password policy recommended by the inventors include non-display of it as it is being entered, encryption when being transmitted, and separate storage of such password data in a restricted area.

Policy enforceable with embodiments of this invention includes security policy requiring that access to information is controlled by a secure log-in process. Brute force log-on attempts wherein a systematic attempt to discover a password should be defeated by not allowing multiple attempts at unsuccessful log-ins. Legal or Logon banners should be part of policy to inform an end-user who the system belongs to, and penalties for unauthorized access. Role-based access control limits access to certain data to those who have proper rights, such as system or security administrators.

Referring again to FIG. 2, Network Control policy enforceable by the tool and process embodiments of this invention further ensure that data is capable of being communicated in a secure environment. Connections between remote computers and servers should be authenticated including using technology to authenticate node. Encryption should be designed into software that is used to communicate sensitive data and this can be ensured by using the present invention. Communication ports should be kept closed unless specifically needed and should be compatible with firewall programs.

User Actions should be subjected to the potential of security audits and the invention can be used to ensure such capability exists. Audit trails should record all attempts to modify critical systems, successful or not. At a minimum such audit trails should include, user identification, data and time for access, device or application accessed, actions performed, and result of action (success or failure).

The inventors have critically recognized that security policy should be enforced during software development and embodiments of this invention allow for such enforcement. Reasons for such enforcement include more cost-efficient and more effective inclusion of security features in software. Secure coding practices allows enforcement of requirements to avoid security mistakes. Requirements include validating all data input to application systems to ensure it is correct and appropriate. Controls to enforce include: not allowing out-of-range values (e.g. negative numbers or unreasonable magnitude values for price or quantity entries for sales-related software); not allowing a web-based application to reveal confidential information like passwords, file system paths, or server names; not allowing security privileges to accede the highest level needed (e.g. restricting root or administrator access); not allowing buffer overflows that can be exploited; not allowing improper error handling; and not allowing sensitive data to be written into temporary files, unless such a file is encrypted. These are examples of controls that can be enforced and is not intended to be an exclusive list, as others may occur to one skilled in the art.

Referring again to FIG. 2, Third-Party Components are another area for which enforcement of security policy in important. All such products must include all security patches and updates in the release of the software being developed at the time of the release and enforcement of this can be carried out as described and with the tools described herein. Likewise all patches or service packs should also be included in a similar fashion. Antivirus policies should also be enforced.

The final step in software development is the Quality Assurance (QA) qualification. Enforcement of security policy for QA may also be done with the tools and methodology described herein. The latest operating system patches must be installed in the testing environment for every release before testing the product. The software product should be tested in an environment that has been hardened according to industry best-practices guidelines, such as those recommended by Microsoft Corporation, or other recognized industry sources or experts. The software product should be scanned using a commercial security scanner for third party application patch compliance and unguarded ports. The scanning report should be used with product test results and reviewed as part of the QA process, preferably, with the tools and methodology as described herein. Digital signatures should be checked for to help ensure code integrity downstream, and viruses and Trojan horses should be scanned for as part of the QA process.

Figure 3:
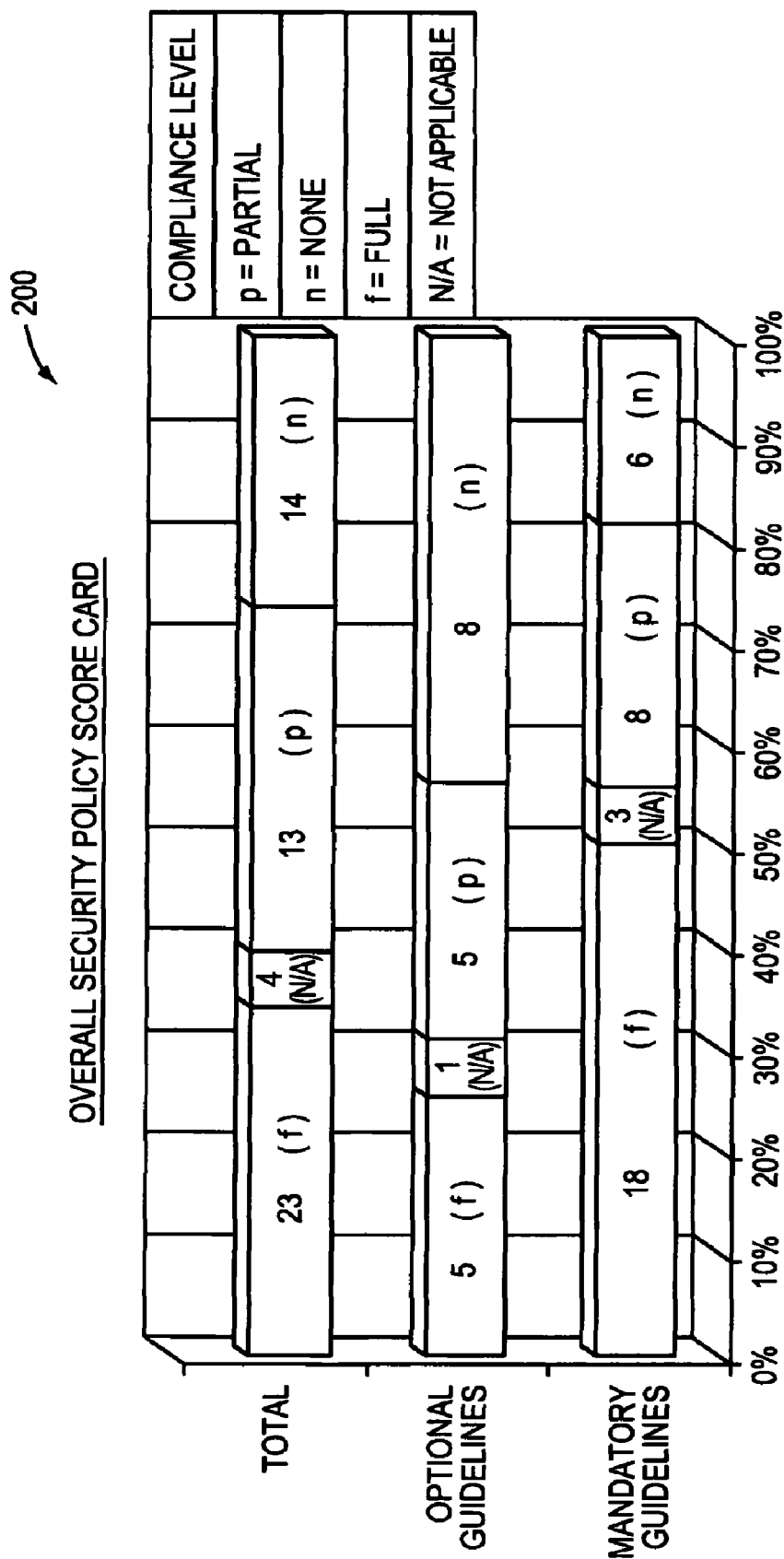
FIG. 3 is a schematic diagram of a security policy-related scorecard, which is useful with embodiments of the invention.

FIG. 3 shows a schematic diagram of a security policy-related scorecard 200, which is useful with embodiments of the invention. The score card tracks whether a studied software product is compliant with policy and grades it accordingly. Compliance level in this example, includes partially compliant (p), no compliance or none (n), full compliance (f), or not applicable (N/A). The compliance level is applied for mandatory and optional guidelines and a total is derived from the two and applied on a percentage basis as shown in the example.

Figure 4:
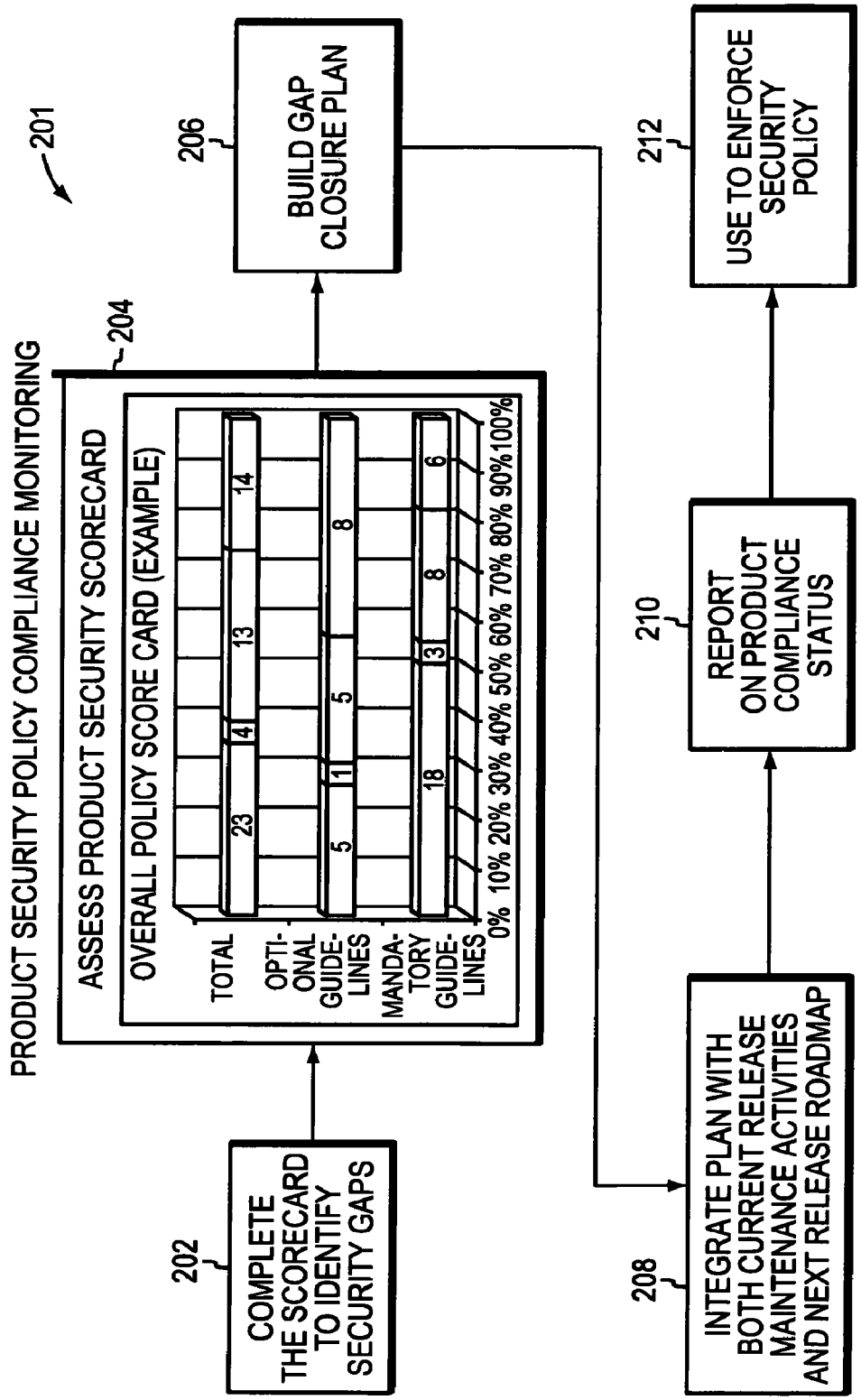
FIG. 4 is an overview of security policy monitoring using the scorecard shown in FIG. 3.

FIG. 4 shows a process 201 for using such a scorecard in a software development environment for product security policy compliance monitoring. In step 202, the process includes completing the scorecard to identify security gaps. The product security scorecard is assessed in step 204 (a policy scorecard similar to the one explained in FIG. 3 is shown). Next a gap closure plan is built in Step 206. In Step 208, the plan is integrated with both current release and maintenance activities and the next release product roadmap. In Step 210, the product compliance status is reported and used in Step 212 to enforce security policy.

Figure 5:
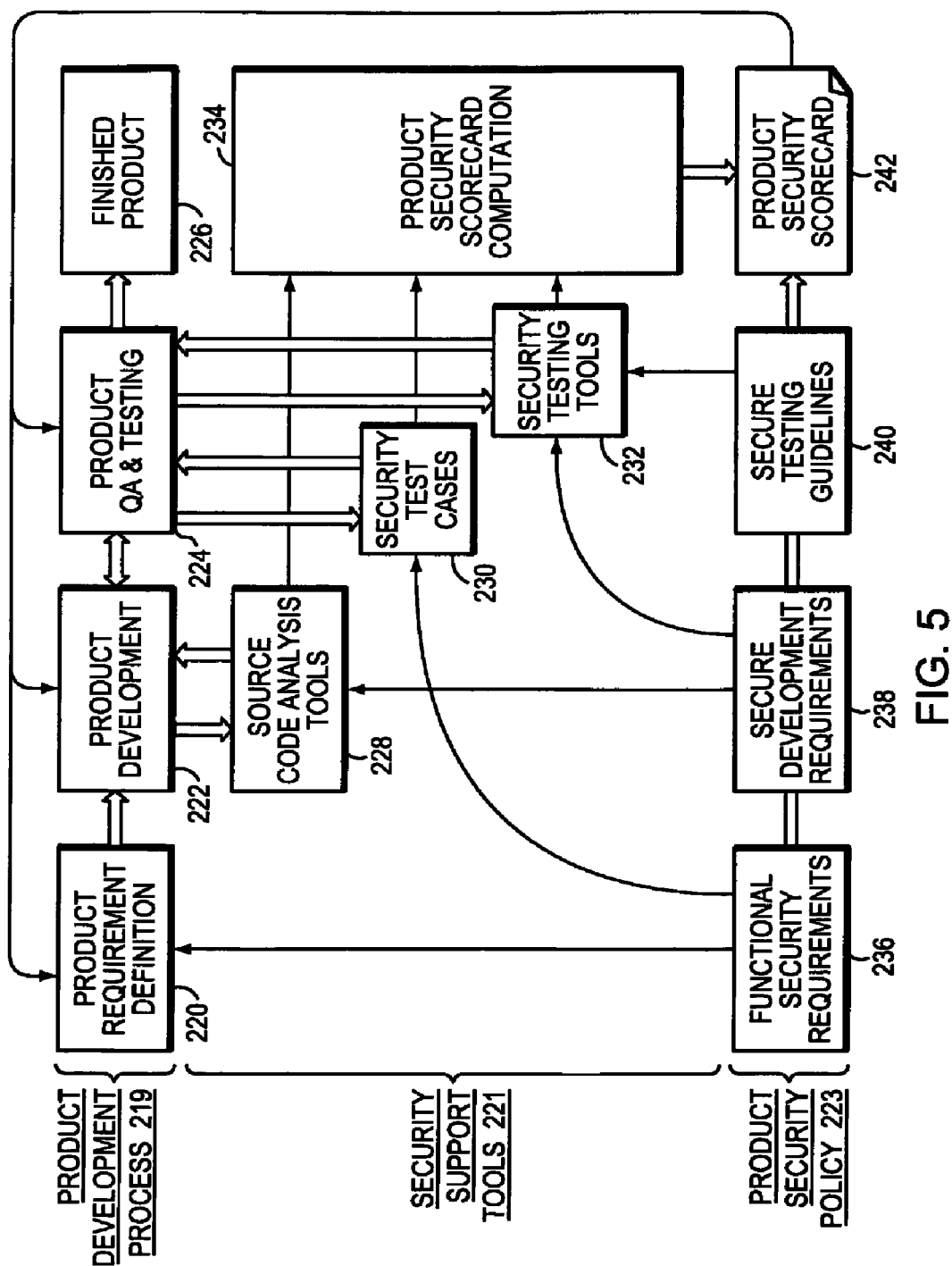
FIG. 5 is a process embodiment of employing the monitoring of the scorecard of FIGS. 3 and 4 with the requirements of FIG. 2 for managing, measuring and enforcing security policy in a software development environment.

Automating at least part of the management, measurement, and enforcement of security using the Logic 34 of FIG. 6 (discussed below) and the methodology of FIG. 5 is now discussed. The Product Security Policy 223 comprises Functional Security Requirements 236, Secure Development Requirements 238, Secure Testing Guidelines 240, and the Product Security Scorecard 242 which is derived from a Product Security Scorecard Computation in Step 234. The Computation is part of the Security Support Tools 221, discussed below. The Product Development Process 219 includes the Product Requirement Definition 220, Product Development generally 222, Product QA & Testing 224, and finally the Finished Product is created in Step 226. Step 224 for Product QA & Testing while influenced by Product Development, also, in turn, reciprocates by influencing the Development itself. It does this by producing test results that provide information that is used to shape and improve security. The Security Support Tools 221 work to orchestrate the Process 219 and Policy 223 to enforce the policy and generally the Tools form an architecture that allows a finished software product in Step 226 that meets security guidelines.

Referring again to FIG. 5, the Functional Security Requirements 236 are used to influence and govern the Security Test Cases 230 run by the Logic, as the Secure Development Requirements 238 influence the Security Testing Tools 232. Requirements 238 also influence Source Code Analysis Tools 228 that impact Product Development 222, which in turn influences QA and Testing in Step 224. Step 224 influences the Test Cases 230 and Tools 232, and each of which, along with the Tools 228 govern and influence the Product Security Scorecard Computation in Step 234. The Computation feeds into the Scorecard 242, which directly is used to enforce security policy. The Scorecard information can be used to influence steps associated with Product Requirement Definition 220, Product Development 222, and/or Product QA and Testing 224, directly and indirectly, and in a comprehensive or iterative fashion. Each of the definitions and activities associated with Steps 220, 222, and 224 can be refined to adhere to a predetermined compliance level that is measured and reflected on the Scorecard 242. In this way compliance with security policy is managed for software being developed and some steps are computer-executed.

Figure 6:
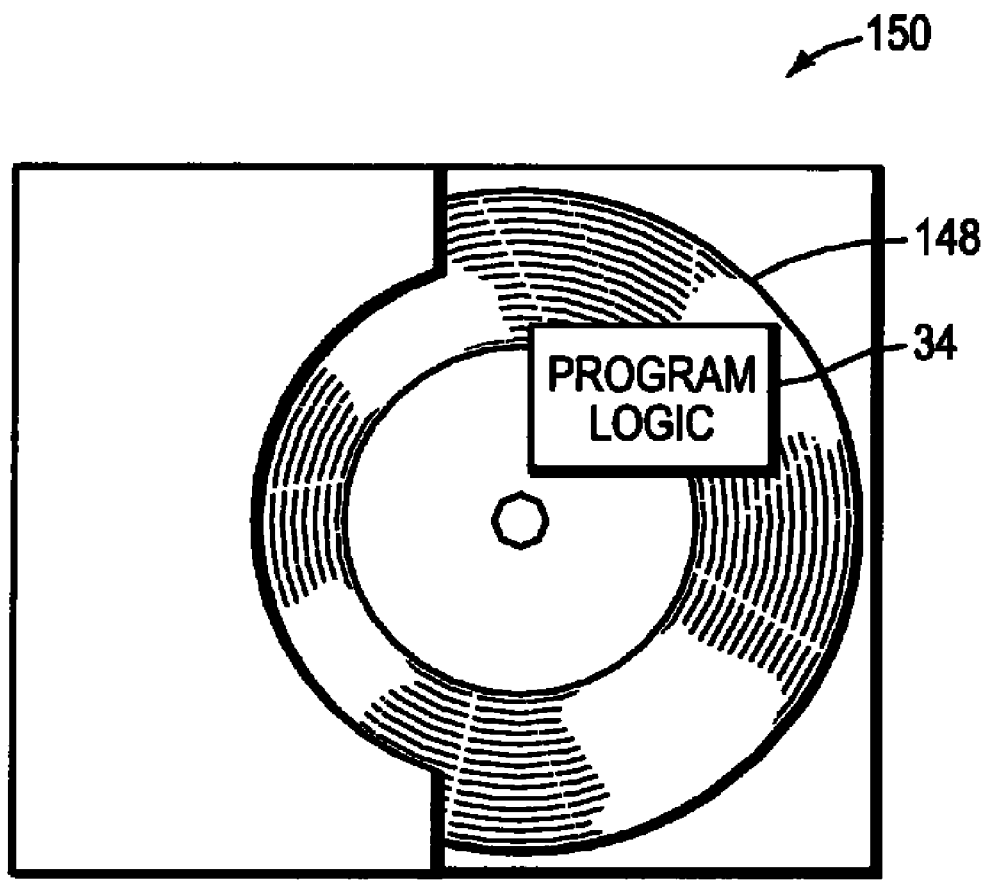
FIG. 6 is a computer program product including a computer-readable medium encoded with program logic capable of executing methodology described herein.

FIG. 6 shows a computer program product 150 including a computer-readable medium 148 encoded with computer program Logic 34 (software in a preferred embodiment). The Logic is configured for allowing a computer to execute the methodology described above and with the Logic steps including the creation of the scorecard can also be computer-executed. One skilled in the art will recognize that the Logic may also be loaded into conventional computer memory and executed by a conventional CPU. The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission. This may be implemented so that when the program code is received and loaded into and executed by a machine, such as a computer, the machine becomes an apparatus for practicing the invention. When executed in a computer's memory by a processing unit, the logic reconfigures a general purpose digital computer into a special purpose digital computer enabled for carrying out the process and methodology discussed herein. When implemented on a general-purpose processor, the program code combines with the processor of the computer to provide a unique apparatus that operates analogously to specific logic circuits.

A system and method has been described for managing compatibility after a change has been made to software that is useful for a data storage system. Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents.

What is claimed is:

1. A computer program product for managing compliance to security policy for software being developed, wherein the security policy is set and comprises one or more security requirements and the software is required to comply with the security policy, the computer program product including a computer-readable storage medium encoded with program logic for allowing the following computer-executable steps to occur:

(a) measuring compliance to the security policy by the software being developed, wherein measuring compliance includes checking for digital signatures, computer viruses, or trojan horses; wherein the security policy enables security requirements for design, development, and quality assurance of the software being developed;

(b) creating a scorecard of the measured compliance of the software being developed to the one or more security requirements of the security policy in step (a); and (c) using the scorecard created in step (b) to enforce the security policy by ensuring that the software being developed meets a predetermined level of compliance as measured by the scorecard including verifying compliance criteria for digital signatures, computer viruses, or trojan horses.

2. The computer program product of claim 1, wherein the computer-executed step (c) is followed by a step of refining product security requirements in order to enforce security policy by using the scorecard created in step (b).

3. The computer program product of claim 2, wherein the step of refining product security requirements in order to enforce security policy by using the scorecard created in step (b) is followed by a step of refining product development activity to further enforce security policy.

4. The computer program product of claim 3, wherein the step of refining product development activity to further enforce security policy is followed by a step of refining product quality assurance and testing in order to further enforce security policy.

5. The computer program product of claim 1, wherein the computer-executed step (c) is followed by a step of refining product development activity in order to enforce security policy by using the scorecard created in step (b).

6. The computer program product of claim 1, wherein the computer-executed step (d) is followed by a step of refining product quality assurance and testing in order to enforce security policy by using the scorecard created in step (b).

7. The computer product of claim 1 wherein the software is in the design, development, or quality assurance stage.

* * * * *